(12) United States Patent
Jessberger

(10) Patent No.: US 8,167,098 B2
(45) Date of Patent: May 1, 2012

(54) BRAKE DUST COLLECTING DEVICE FOR MOTOR VEHICLES

(75) Inventor: Thomas Jessberger, Asperg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/497,831

(22) Filed: Jul. 6, 2009

(65) Prior Publication Data

US 2009/0265880 A1     Oct. 29, 2009

Related U.S. Application Data

(63) Continuation of application No. PCT/EP2007/063460, filed on Dec. 6, 2007.

(30) Foreign Application Priority Data

Jan. 8, 2007    (DE) ..................... 20 2007 000 246 U

(51) Int. Cl.
     *F16D 65/12*      (2006.01)

(52) U.S. Cl. ................................. 188/264 A; 188/264 R

(58) Field of Classification Search ............. 188/218 A, 188/264 A, 264 W, 264 R; 301/6.3, 37.105
See application file for complete search history.

(56) References Cited

U.S. PATENT DOCUMENTS

| | | | | |
|---|---|---|---|---|
| 2,181,008 A | * | 11/1939 | Bonzack | ............ 188/264 R |
| 2,720,947 A | * | 10/1955 | Martin | ............ 188/264 R |
| 2,761,530 A | * | 9/1956 | Dawley | ............ 188/264 W |
| 2,762,469 A | * | 9/1956 | Lyon | ............ 188/264 W |
| 2,895,766 A | * | 7/1959 | Leopold, Jr. | ............ 301/5.22 |
| 3,023,858 A | * | 3/1962 | Yocom | ............ 188/264 R |
| 3,059,730 A | * | 10/1962 | Nickell et al. | ............ 188/71.6 |
| 5,772,286 A | | 6/1998 | Jordan | |
| 6,310,545 B1 | * | 10/2001 | Sapir | ............ 340/453 |

FOREIGN PATENT DOCUMENTS

| | | |
|---|---|---|
| CH | 687013 A5 | 8/1996 |
| DE | 3152498 A1 * | 6/1983 |
| DE | 0204433 A1 | 12/1986 |
| DE | 3634875 A1 * | 4/1988 |
| DE | 4240873 | 6/1994 |
| DE | 4240873 A1 | 6/1994 |
| DE | 19643869 | 5/1998 |
| DE | 19643869 C2 | 10/2001 |
| DE | 20308576 | 12/2003 |
| DE | 202005006844 | 7/2005 |
| DE | 202005009278 | 5/2006 |
| DE | 202005017472 | 5/2006 |
| EP | 0204433 A | 12/1986 |
| FR | 2751390 A | 1/1998 |
| FR | 2815099 A | 4/2002 |

OTHER PUBLICATIONS

PCT/EP2007/063460 search report (with WO 2008/083884A1 publication, filed herewith).
German patent office search report of priority application DE 20 2007 000 246.7.

\* cited by examiner

*Primary Examiner* — Robert Siconolfi
*Assistant Examiner* — Stephen Bowes
(74) *Attorney, Agent, or Firm* — James Hasselbeck

(57) ABSTRACT

A brake dust collecting device for a motor vehicle has a dust collecting unit and an air flow generating device that generates an air flow that flows across brake parts of a motor vehicle wheel brake and that supplies brake dust of the wheel brake to the dust collecting unit. The air flow generating device has a rotatable fan blade and the dust collecting unit is a filter element.

18 Claims, 8 Drawing Sheets

BRAKE DUST COLLECTING DEVICE FOR MOTOR VEHICLES

CROSS REFERENCE TO RELATED APPLICATIONS

This application is a continuation application of international application No. PCT/EP2007/063460 having an international filing date of 6 Dec. 2007 and designating the United States, the International Application claiming a priority date of 8 Jan. 2007, based on prior filed German patent application No. 20 2007 000 246.7, the entire contents of the aforesaid international application and the aforesaid German patent application being incorporated herein by reference.

TECHNICAL FIELD

This disclosure relates to a brake dust collecting device for motor vehicles and, more particularly, to a brake dust collecting device including an air flow generating device for generating an air flow that flows past the brake parts of a motor vehicle wheel brake and carries brake dust of the wheel brake to a dust collecting unit.

BACKGROUND OF THE INVENTION

A collecting device for the brake dust that is produced in the motor vehicle wheel brake by abrasion of the brake pads when braking a motor vehicle is disclosed in German patent application 196 43 869 C2. The brake dust collecting device is designed as a suction device that includes a dust collector whose end facing the brake disc has a suction opening and whose other end is connected by a suction line to the collecting container for collecting the brake dust. The collecting container is connected by a suction line to the intake manifold of the combustion engine so that the vacuum present in the intake manifold is also acting in the collecting container and in this way removal by suction of the brake dust and collection in the collecting container can be realized.

This configuration requires a flow connection between the intake manifold of the induction tract of the internal combustion engine and the collecting container for the brake dust; this requires a significant constructive expenditure. A disadvantage is also to be seen in that by branching off the suction line into the collecting container the pressure in the induction tract is affected so that also the air supply into the cylinders of the internal combustion engine changes. This must be taken into consideration in the motor control. Moreover, a use in charged internal combustion engines is not possible because of the overpressure produced by the compressor.

It is therefore an object of the present invention to provide with simple constructive means an effective brake dust collecting device for motor vehicles. Advantageously, the brake dust collecting device should also have high efficiency.

SUMMARY OF THE INVENTION

In accordance with the present invention, this is achieved in that the air flow generating device is embodied as at least one rotatable fan blade and in that the dust collecting unit includes a filter element. The dependent claims provide expedient further embodiments.

In the brake dust collecting device for motor vehicles according to the invention, the air flow generating device by means of which the air flow is produced that transports the brake dust away from the braking devices is configured in the form of at least one fan blade. This fan blade produces an air flow which is guided in the direction toward the dust collecting unit that is embodied as a filter element. The brake dust that is entrained by the air flow is filtered out by the filter elements; subsequently, the filtered air flow can be released into the atmosphere. The filtration in the filter element enables the best possible cleaning of the air flow. On the one hand, this has the advantage that the environmental loading with particulate matter is significantly reduced and, on the other hand, it is prevented that the brake dust will deposit in the visible area of the wheel rim or on car body parts of the motor vehicle leading to soiling that impairs the aesthetic appearance and that possibly, in certain situations, can cause functional impairments. The air flow is guided in particular from the exterior side of the motor vehicle inwardly and is subjected to filtration in the filter element.

The at least one fan blade is positioned expediently on the inner side of the wheel rim or on a component that is fixedly connected to the wheel rim. The rotational movement of the wheel rim is thus transmittable onto the fan wheel wherein by means of a flow-beneficial configuration of the fan blade fresh air is taken in particularly through flow openings in the wheel rim and is guided across the brake parts where the brake dust is produced, i.e., across the brake discs or possibly also the brake drums. The pressure of the air flow that is generated by the at least one fan blade is great enough to overcome the flow resistance of the filter element. When the filter element becomes soiled over the course of time and becomes clogged with abrasion particles, the filter element can be removed and either cleaned or exchanged.

In a preferred embodiment, a plurality of fan blades are distributed about the circumference. They can be secured on a fan ring and together with the fan ring form a fan wheel. The fan blades, optionally the entire fan wheel, are either mounted fixedly on the wheel rim or coupled to a component that is connected to the wheel rim or are rotatably supported on the wheel rim or on the additional component. In case of a fixed support the rotation of the fan blades causes the generation of the air flow for transport of the brake dust to the filter element; in case of a rotatable support the relative movement between wheel rim and fan blade generates the air flow.

In case of a fixed coupling, the fan blade rotates together with the wheel rim wherein the air flow is generated by the flow-beneficial shape of the fan blade.

In a special embodiment of the invention, the fan blade is formed by a web of the wheel rim. In this connection, the web of the wheel rim is shaped such that the required air flow is generated by the web itself. By means of the unitary configuration of the fan blade and the wheel rim, additional components can be saved. The wheel rim webs which are required for the stability of the wheel rim thus take on additionally also the task of producing the required air flow.

In case of a rotatable support, the fan blade expediently has the same axis of rotation as the wheel rim. In this embodiment, the fan blade or the fan wheel and the wheel rim can perform a rotation relative to one another which can be used for realization of fluidic effects, for example, for a continuation of the revolution of the fan blade even after decrease of the rotational speed of the wheel rim or upon stopping of the wheel. This is achieved in particular by the inertia of the fan blade or of the fan wheel wherein this effect can be significantly improved or reinforced when on the fan blade or the fan wheel an additional centrifugal mass is provided that significantly increases the moment of inertia and thus also the rotary capability of the fan wheel after braking the wheel. The increased moment of inertia results in that even after termination of the braking process the fan blade or the fan wheel continues to rotate for a certain amount of time and creates an air flow in the direction toward the filter element. In this way, the efficiency of filtration is even more improved to a significant extent.

Providing an additional centrifugal mass on the fan blade or the fan wheel also has the advantage that in this way with simple measures a fan wheel can be matched to different applications. According to a particularly advantageous further embodiment, the centrifugal mass element is adjustable in the radial direction on the fan blade or the fan wheel, in particular by means of a spring element that secures the centrifugal mass element in a position that is radially retracted adjacent to the axis of rotation. As the vehicle begins to travel, the force of the spring element is still sufficient to secure the centrifugal mass element against the centrifugal force in the position near the axis of rotation. With increasing rotational speed of the wheel the spring forces are overcome and the centrifugal mass element moves radially outwardly along the fan blade or the fan wheel so that the moment of inertia is increased. In this way, the fan wheel can store additional kinetic energy that after braking of the wheel is released and leads to a longer sustained rotation of the fan wheel relative to the wheel rim.

It can be expedient to provide the fan blade with a locking device that below an acceleration threshold or deceleration threshold is in a locking position in which the fan blade is coupled fixedly to the wheel rim. The locking position can be selected with regard to visual aspects, for example, such that when the vehicle is standing still, below the acceleration threshold, the fan blade is hidden immediately behind the web of the wheel rim so that the fan blade is not visible from the exterior. This fixed locking action between fan blade and the wheel rim is maintained as long as the value of the acceleration threshold is not surpassed, in particular the vehicle is not braked. During a braking process, however, the value of the acceleration threshold is usually surpassed so that the fan blade leaves the locking position and moves into the release position and can perform a relative movement relative to the wheel rim.

For improving the filtration efficiency, it can be expedient to design the filter element to be electrostatic. For this purpose, advantageously as a function of momentary state parameters or operating parameters an electrical voltage is supplied to the filter element so that the deposition of electrically loaded dust particles on the filter element is significantly improved. Applying electrical voltage is preferably coupled to the braking process in such a way that the braking process is detected, in particular by actuation of the brake pedal, and in a control unit a signal is generated accordingly by means of which a voltage source is connected to the filter element. When releasing the brake pedal basically also the supply of electrical voltage is canceled, wherein it can be expedient to provide a dead time so that for a certain amount of time even after termination of the braking process the electrical voltage is still supplied to the filter element.

According to a further advantageous embodiment, between the filter element and the wheel rim a sealing element is provided that is to prevent leakage flows that circumvent the filter element. The sealing element can be connected either fixedly to the filter element or to the wheel rim or with a component that this fixedly coupled to the wheel rim.

The filter element is preferably not supported so as to be rotatable but is seated on a component secured to the car body, for example, the casing of the wheel bearing.

According to a further advantageous embodiment, an electrical pump for generating or enhancing the air flow is provided. This electrical pump is located for example downstream of the filter element and generates suction that enhances flow through the filter element and at the same time causes the filtered air flow to exit.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the Figures the same parts are identified with the same reference numerals.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
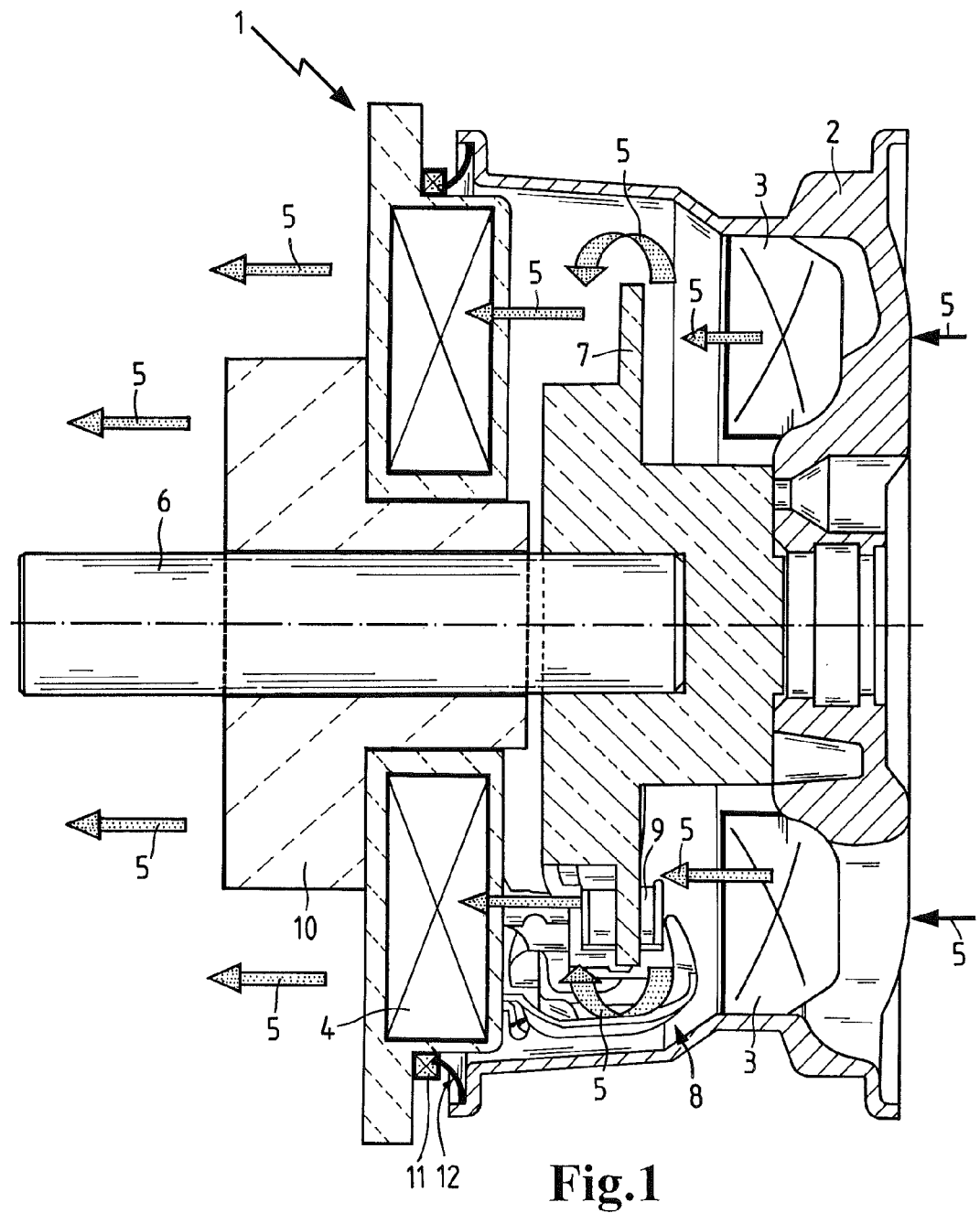
FIG. 1 shows a section of a wheel rim of a motor vehicle with a brake dust collecting device for filtration of brake dust that is produced as abrasion of the vehicle disc brake, wherein the brake dust collecting device includes fan blades on the inner side of the wheel rim and a filter element.

FIG. 1 shows a brake dust collecting device 1 for brake dust that is produced as abrasion of a motor vehicle disc brake. The brake dust collecting device 1 is received in the interior of a wheel rim 2 and includes fan blades 3 as well as a dust collecting unit in the form of a filter element 4. The fan blades 3 are located on the inner side of the wheel rim 2 that is facing the vehicle and are fixedly connected to the wheel rim. A plurality of such fan blades 3 are distributed about the circumference. The fan blades 3 have a flow-beneficial shape and generate an air flow 5 that is directed from the exterior to the interior and that passes through the openings in the wheel rim 2. The air flow 5 flows across the brake disc 7 against which the brake pads 9 applied by the brake caliper 8 are resting and transports the brake dust to the filter element 4 that is arranged stationarily on the vehicle. The filter element 4 is annularly shaped and is seated on a casing 10 of the wheel bearing fixed to the car body. Alternatively, an attachment of the filter element on the steering knuckle or wheel carrier is possible also. The wheel bearing casing 10 surrounds a wheel axle 6 that supports the brake disk 7 as well as the wheel rim 2. The air flow 5 passes through the filter element 4 wherein the brake dust particles are filtered out at the unfiltered side so that the filtered air flow exits via the filtered side of the filter element 4 and is finally removed. On the one hand, in this way an effective removal of the brake dust particles from the air flow is achieved that no longer can deposit in the area of the wheel. On the other hand, the air flow that flows across the brake disc 7 also effects cooling.

In order to separate the unfiltered side from the filtered side of the filter element and in order to prevent leakage flows between the unfiltered side and the filtered side, on the radially outwardly positioned shoulder of the filter element 4 an annular sealing element 11 is provided that has a circumferential sealing lip 12 resting seal-tightly against an axial end face of the wheel rim 2. This sealing lip 12 effects, on the one hand, a flow-tight closure of the interior space of the wheel rim 2 that forms the unfiltered side and, on the other hand, the sealing lip enables without wear, or with only minimal wear, a rotational movement of the wheel rim 2.

Figure 2:
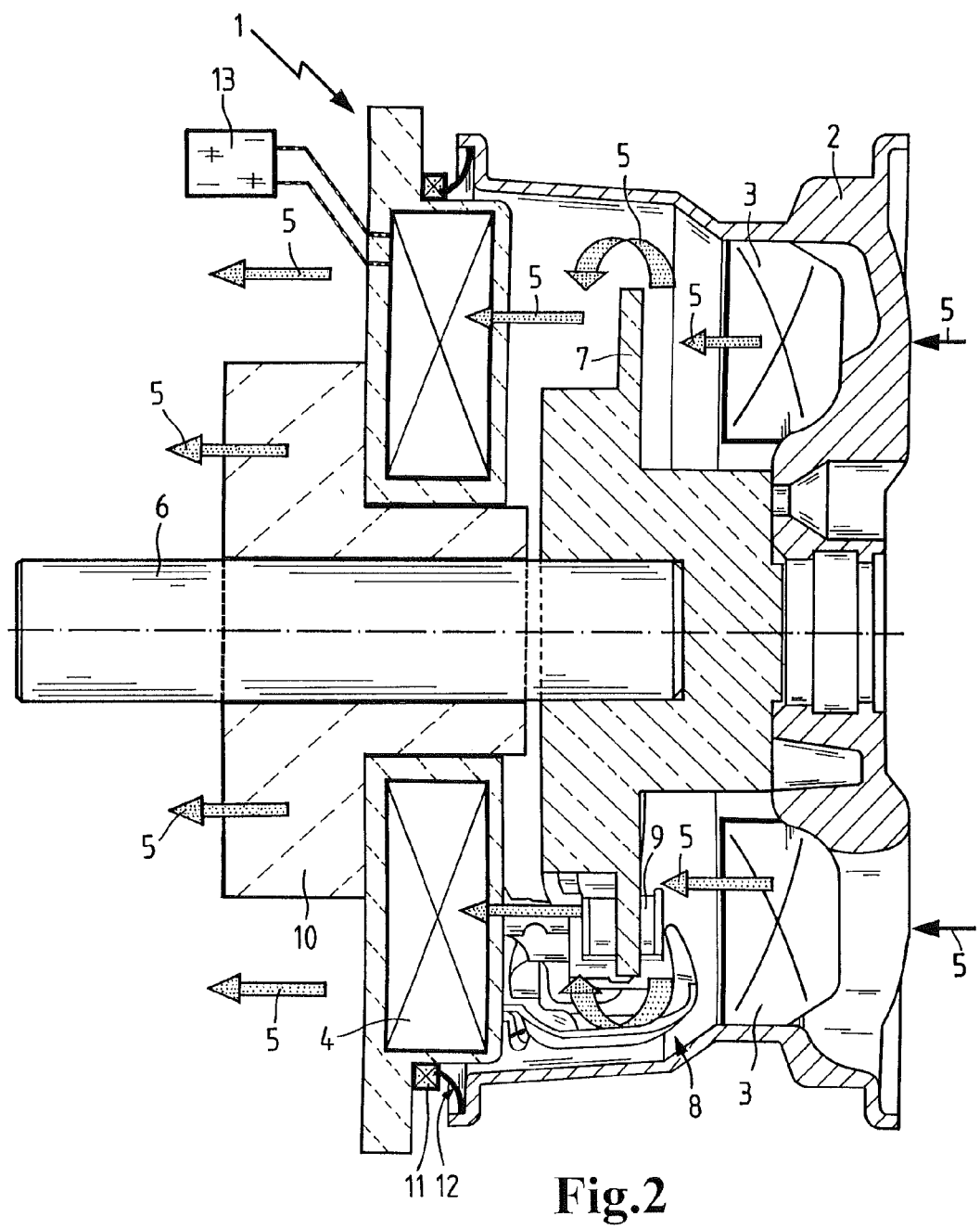
FIG. 2 shows a wheel rim with a brake dust collecting device in a modified embodiment in which the filter element is configured as an electrostatic filter medium to which electrical voltage is supplied during the braking process.

The embodiment illustrated in FIG. 2 corresponds in its basic construction to that of FIG. 1. The brake dust collecting device 1 includes likewise fan blades 3 that are fixedly connected to the wheel rim 2 for producing an air flow 5 that flows past the brake disc 7 and the brake pads 9 and is directed toward a filter element 4. In addition, in the embodiment according to FIG. 2 the filter element 4 is configured as an electrostatic filter medium that has assigned thereto an electrical power connector 13 by means of which electrical voltage can be supplied to the filter element 4. The level of voltage that is supplied as well as the point in time and the duration of the voltage to be supplied depends on diverse state parameters and operating parameters of the vehicle or of the devices correlated with the vehicle. In this connection, in particular a braking process is of interest that is detected by means of suitable sensors so that the control unit of the vehicle generates control signals in response and the electric power connector 13 is actuated which, in turn, supplies voltage to the filter element 4.

Figure 3:
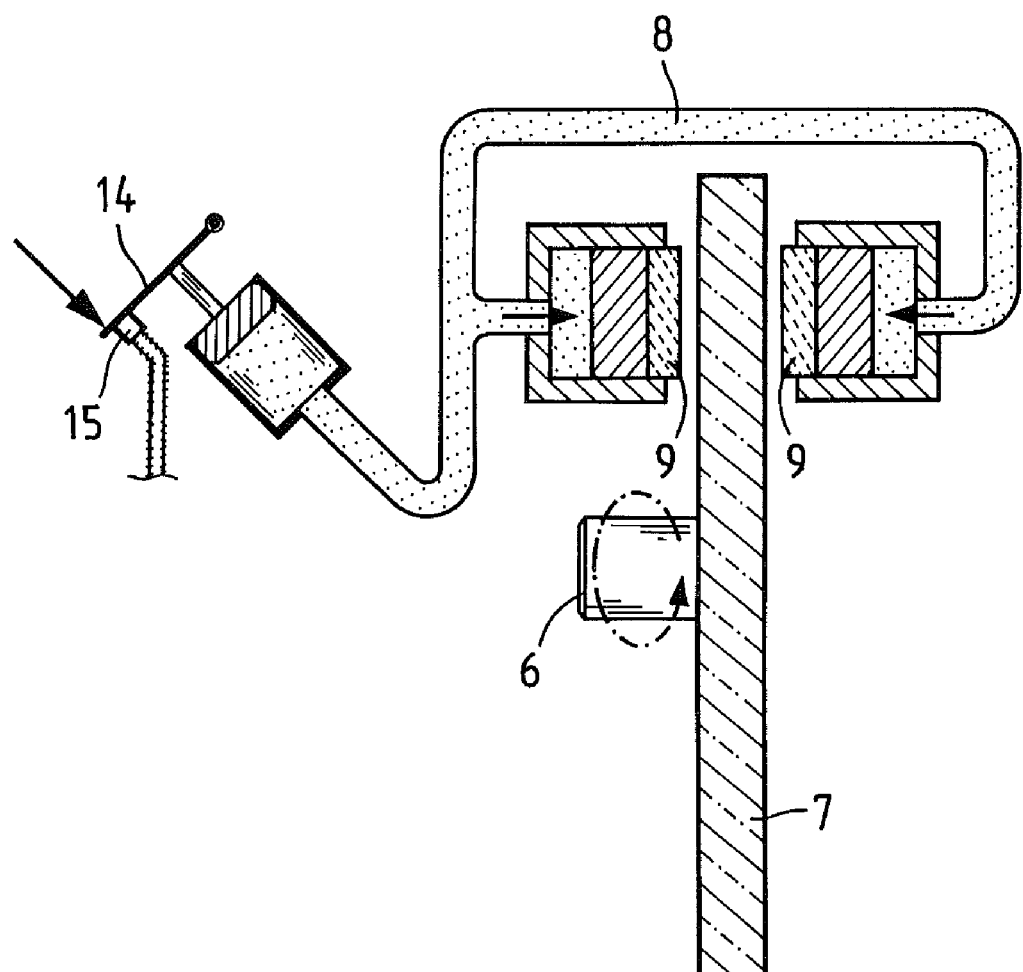
FIG. 3 is a schematic illustration of a motor vehicle disc brake actuated by a brake pedal wherein the actuation of the brake pedal is determined by a sensor and the sensor signals are used for supplying a voltage to the filter element.

FIG. 3 shows a motor vehicle disc brake device in a schematic illustration. The disc brake device is actuated by means of a brake pedal 14 by the driver wherein the change of the brake pedal position is detected by a sensor 15 that supplies corresponding sensor signals to the control unit so that the afore described control signals for supplying a voltage to the filter element are supplied to the electric power connector 13.

Figure 4:
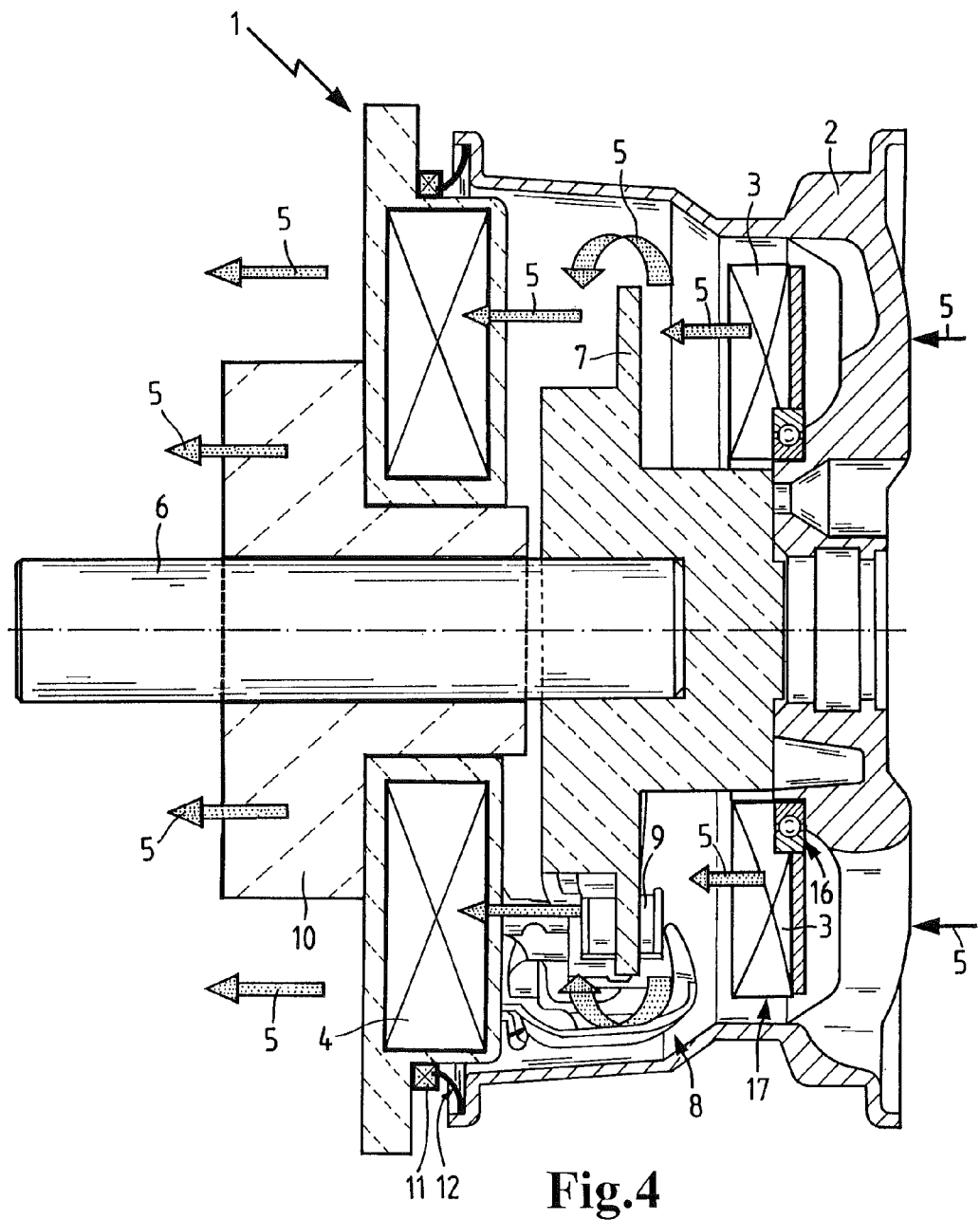
FIG. 4 shows a wheel rim with a brake dust collecting device that includes a fan wheel that is rotatably supported on the wheel rim and includes a plurality of fan blades.

In FIG. 4 a further variant of a brake dust collecting device 1 on a wheel rim 2 is illustrated. The brake dust collecting device 1 includes again a filter element 4 as well as fan blades 3 by means of which the air flow 5 is generated. In this embodiment, the fan blades 3 are components of a fan wheel 17 that additionally includes a fan ring 16 on which the fan blades 3 are arranged so as to extend radially and by means of which the fan wheel 17 is rotatably supported on the inner side of the wheel rim 2. This rotatable supporting action of the fan wheel 17 relative to the wheel rim 2 with same axis of rotation enables a relative rotational movement of the fan wheel 17 relative to the wheel rim 2. Because of the inertia of the fan wheel 17 it will continue to rotate even after braking of the vehicle and after the wheel rim 2 has stopped and will continue to produce an air flow 5 after stopping that supplies the brake dust particles to the filter element 4.

Figure 5:
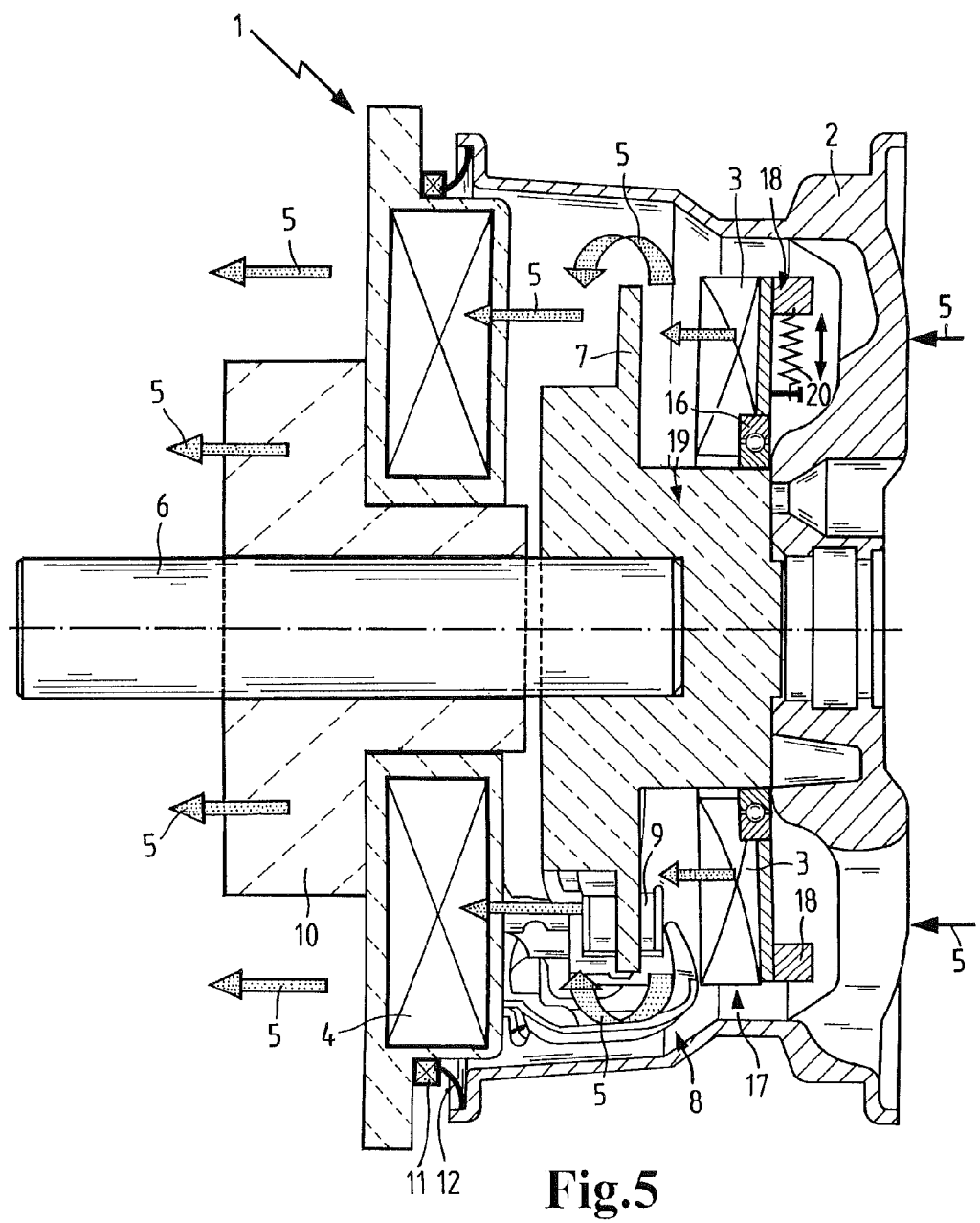
FIG. 5 shows an illustration in accordance with FIG. 4 but the fan wheel is supported on a projection of the brake disc and a centrifugal mass element is provided on a fan blade of the fan wheel.

In the embodiment according to FIG. 5 the brake dust collecting device is also provided with a fan wheel 17 comprised of a rotatably supported wheel ring 16 and fan blades 3 arranged thereat. The fan ring 16 is however rotatably supported on a projection 19 which is a component of the brake disc 7.

Moreover, on the fan wheel 17 a centrifugal mass element 18 is arranged which imparts to the fan wheel 17 a greater inertia so that the fan wheel after braking of the wheel rim 2 continues to rotate for an extended period of time to produce an air flow 5. The centrifugal mass element 18 can be connected fixedly on the fan wheel 17 (lower illustration), in particular in the radially outwardly positioned area, in order to increase the moment of inertia significantly. According to a further variant, also illustrated in FIG. 5, the centrifugal mass element 18 is secured by means of a spring element 20 so as to be radially slidable on the fan wheel 17 (upper illustration). The spring element 20 retains the centrifugal mass element 18 in a radially retracted position. With increasing angular speed of the fan wheel 17 the spring element 20 becomes longer as a result of the centrifugal forces acting on the centrifugal mass element so that the centrifugal mass element 18 moves radially outwardly. This radial displacement travel of the centrifugal mass element results in an increase of the moment of inertia of the fan wheel. By selecting the spring constant of the spring element 20 it is possible to influence the angular speed of the fan wheel at which angular speed the centrifugal mass element 18 will move radially outwardly.

Figure 6:
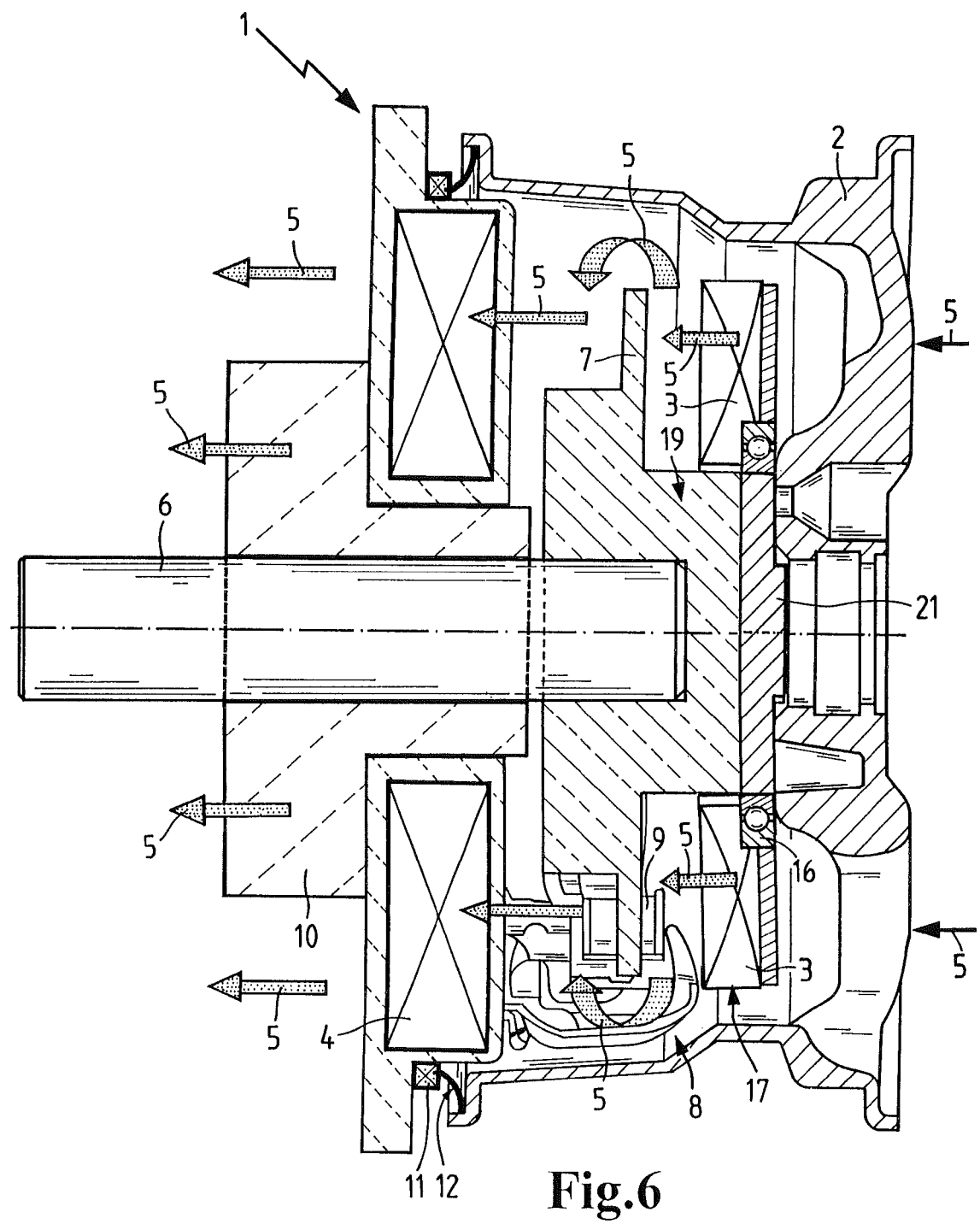
FIG. 6 shows a further brake dust collecting device whose fan wheel is supported rotatably on an intermediate ring that adjoins the end face of the brake disc for enlarging the track width.

The embodiment according to FIG. 6 corresponds substantially to that of FIG. 4 but with the difference that the fan wheel 17 in the area of its fan ring 16 is supported rotatably by means of an intermediate ring 21 which ring 21 is positioned at an end face of the projection 19 on the brake disc 7 and is located between this projection 19 and the wheel rim 2. The intermediate ring 21 can be used for enlarging the track width.

Figure 7:
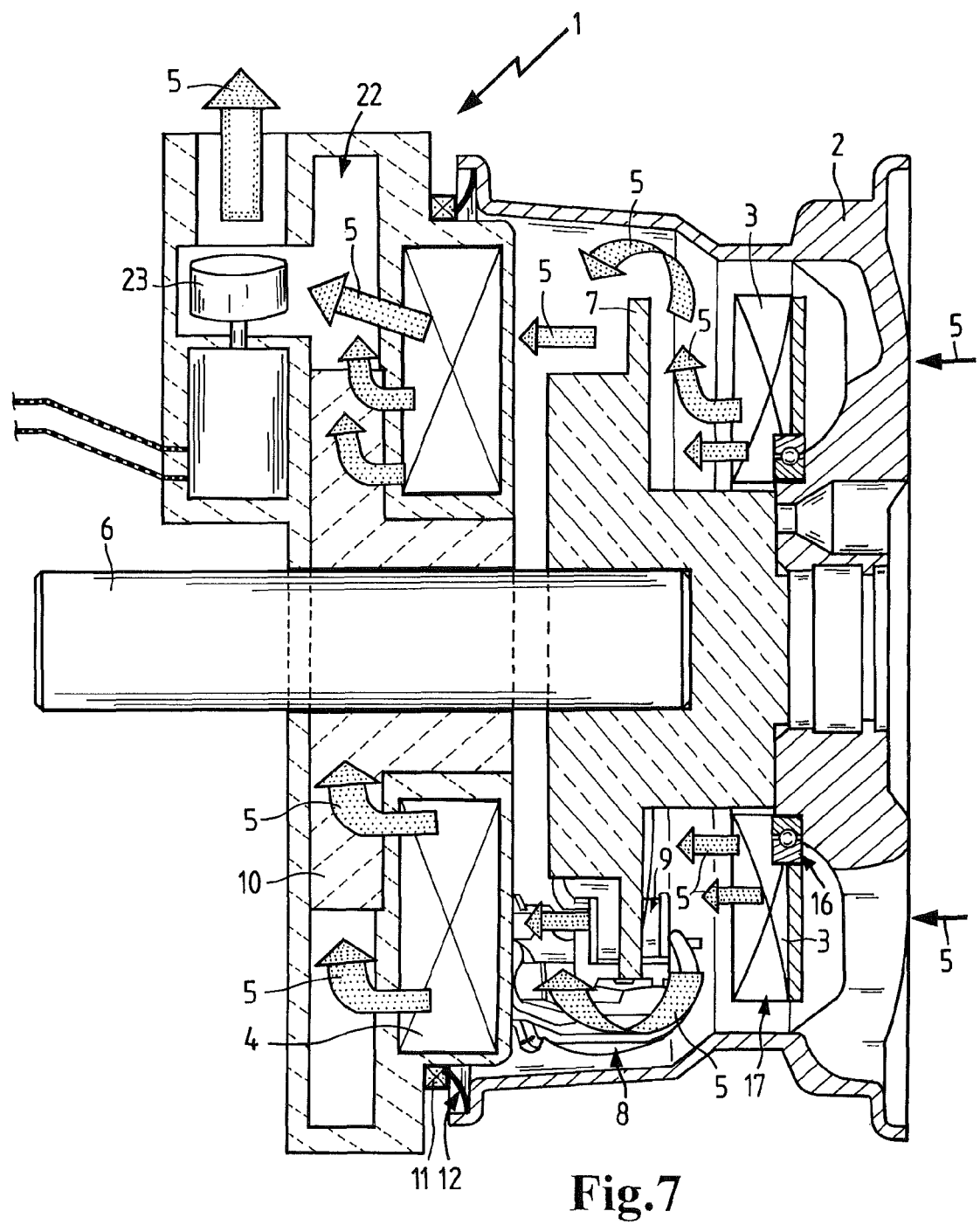
FIG. 7 shows a wheel rim with a brake dust collecting device in accordance with the embodiment of FIG. 4 but with an additional electric pump downstream of the filter element for generating suction that enhances air flow.

In the embodiment according to FIG. 7 the brake dust collecting device 1 is provided with a rotatably supported fan wheel 17 whose fan ring 16 is rotatably supported on the wheel rim 2 as well as a filter element 4 to which the air flow 5 is supplied. On the filtered side of the filter element 4 a clean room 22 for receiving the filtered air flow is formed. In this clean room 22 there is an electric pump 23 that conveys the air flow 5 out of the clean room 22. In this way, on the filtered side of the filter element 4 a suction effect is created that enhances also the air flow at the unfiltered side of the filter element, i.e., in the interior that is surrounded by the wheel rim 2 and that is delimited on one side by the unfiltered side of the filter element, in which interior the brake disc 7 is located. Expediently, the electric pump 23 is switched on only as needed, in particular only during a braking process.

Figure 8:
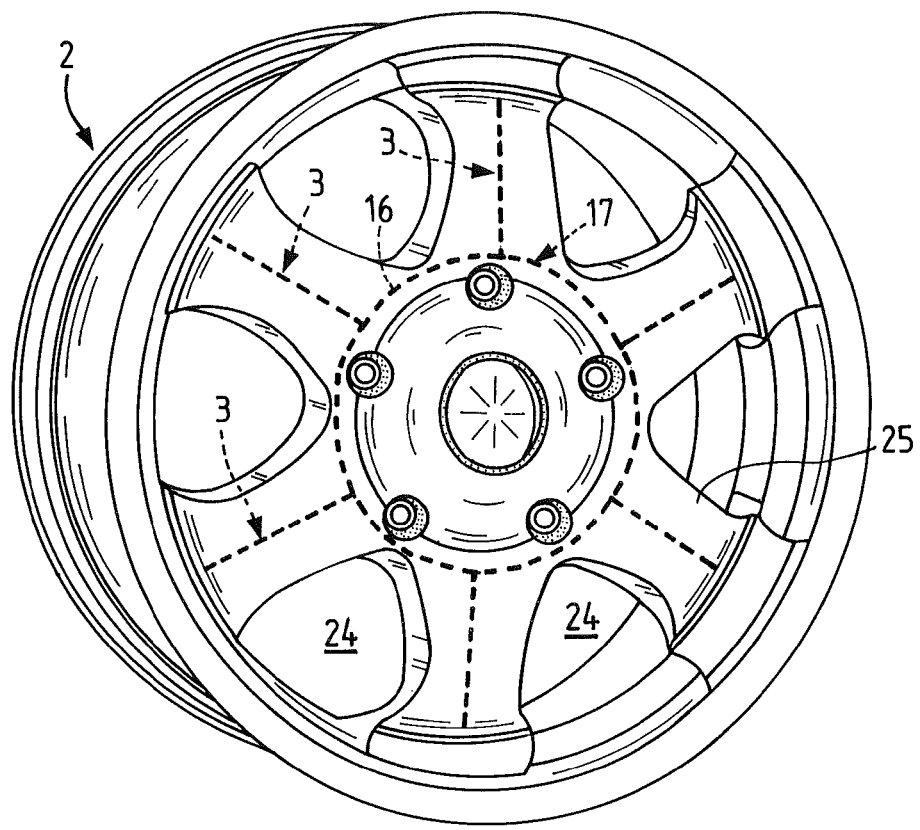
FIG. 8 is a perspective illustration of a wheel rim with schematically shown position of the fan blades of the fan wheel.

In FIG. 8 only the wheel rim 2 is shown. The dotted lines schematically show the hidden fan wheel 17 and the fan blades 3 on the fan ring 16. The wheel rim 2 has radially extending webs 25 between which an opening 24 is formed, respectively. The fan wheel 17 is rotatably supported on the wheel rim 2 but in driving states in which no braking action is performed it is in a locking position relative to the wheel rim 2 in which the fan blades 3 are positioned immediately behind the webs 25 so that they are not visible from the exterior. Only during the braking process, upon surpassing a deceleration threshold, the fan wheel 17 is released from the locking position and moves relative to the wheel rim 2 with a relative angular speed.

Figure 9:
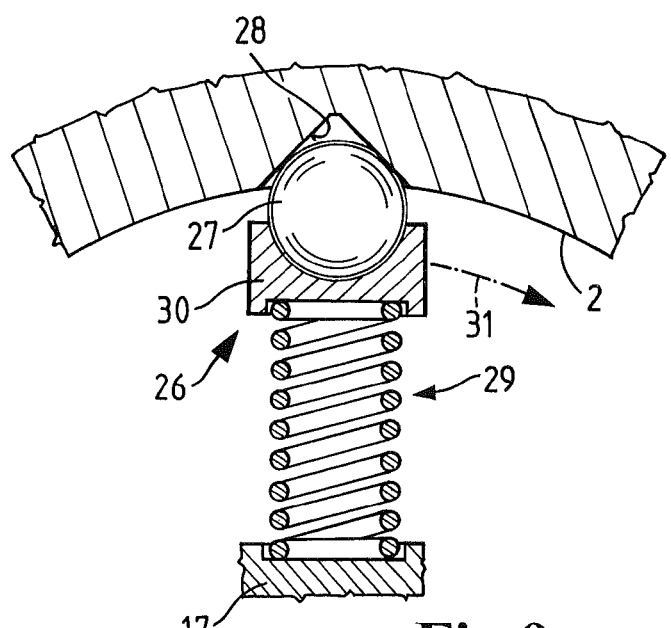
FIG. 9 is a schematic illustration of the locking device by means of which the rotatably supported fan wheel is locked on the wheel rim.

In FIG. 9, a locking device 26 is schematically shown in detail by means of which the fan wheel 17 during regular acceleration of the vehicle and at constant speed is in a locking position relative to the wheel rim 2. The locking device 26 includes a locking ball 27 on the radially outwardly positioned end face of a holder 30 that is connected by a locking spring 29 to a component of the fan wheel 17. In the locking position the locking ball 27 projects into a locking receptacle 28 that is formed on the wheel rim 2. When the fan wheel 17 moves relative to the wheel rim 2, the holder 30, as indicated by arrow 31, also carries out a relative movement relative to the wheel rim 2 so that the locking ball 27 will slide out of the locking receptacle 28 and the locking position is canceled. With decreasing relative angular speed of the fan wheel 17 relative to the wheel rim 2 the force of the locking spring 29 is again sufficient in order to restore the locking position as soon as the locking ball 27 passes across the locking receptacle 28.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A brake dust collecting device for motor vehicles, the brake dust collecting device comprising:
a dust collecting unit;
an air flow generating device that generates an air flow that flows across brake parts of a motor vehicle wheel brake and that supplies brake dust of the wheel brake to said dust collecting unit;
wherein said air flow generating device comprises at least one rotatable fan blade,
wherein said dust collecting unit comprises a filter element,
wherein said air flow generating device is arranged within the interior of a wheel rim, said air flow generating device positioned behind an inner side of the wheel rim between axial end faces of the wheel rim and said brake parts,
wherein said dust collecting unit is seated on a wheel bearing casing of said motor vehicle and extends radially outwards resting seal-tightly against an axial end face of said wheel rim to form a flow-tight closure between said dust collecting unit and said wheel rim, said flow-tight closure of said dust collecting unit with said wheel bearing casing and said wheel rim end face providing a flow-tight closure of interior space of said wheel rim that forms an unfiltered side of said filter element,
wherein said dust collecting unit includes an annular sealing element arranged on a radially outwardly positioned shoulder of said dust collecting unit, said annular sealing element resting seal-tightly against said axial end face of said wheel rim, said annular sealing element effecting said flow-tight closure preventing leak flows between said dust collecting unit and said wheel rim, and
wherein said filter element is arranged such that said air flow generated by said air flow generating device flows through and is filtered by said filter element of said dust collecting unit.

2. The brake dust collecting device according to claim 1, wherein said at least one fan blade is a plurality of fan blades distributed circumferentially.

3. The brake dust collecting device according to claim 2, wherein
said air flow generating device comprises a fan ring,
wherein said plurality of fan blades are arranged on said fan ring, and
wherein said fan ring and said plurality of fan blades form a fan wheel.

4. The brake dust collecting device according to claim 1, wherein said at least one fan blade is arranged on an inner side of said wheel rim or of a component that is fixedly coupled to said wheel rim.

5. The brake dust collecting device according to claim 4, wherein said fan blade is connected fixedly to said wheel rim.

6. The brake dust collecting device according to claim 4, wherein said fan blade is formed by a web of said wheel rim.

7. The brake dust collecting device according to claim 4, wherein
said fan blade is rotatably supported on said wheel rim or on said component and
wherein said fan blade and said wheel rim or said component rotate about a same axis of rotation.

8. The brake dust collecting device according to claim 7, wherein said air flow generating device comprises a centrifugal mass element that is arranged on said fan blade or on a fan wheel of which said fan blade is a part.

9. The brake dust collecting device according to claim 8, wherein said centrifugal mass element is adjustable in a radial direction on said fan blade.

10. The brake dust collecting device according to claim 9, wherein said centrifugal mass element is adjustably secured by a spring element on said fan blade.

11. The brake dust collecting device according to claim 7, wherein
said fan blade comprises a locking device that has a locking position and a release position,
wherein said locking device is in said locking position below an acceleration threshold and is in said release position above said acceleration threshold,
wherein in said locking position said fan blade is fixedly coupled to said wheel rim and in said release position said fan blade is movable relative to said wheel rim.

12. The brake dust collecting device according to claim 1, wherein said filter element is electrostatic.

13. The brake dust collecting device according to claim 12, wherein electrical voltage is supplied to said filter element as a function of momentary state parameters and operating parameters.

14. The brake dust collecting device according to claim 12, wherein during a braking process electrical voltage is supplied to said filter element.

15. The brake dust collecting device according to claim 1, wherein said filter element is fixedly mounted on said wheel bearing casing.

16. The brake dust collecting device according to claim 1, wherein said sealing element is fixedly connected to said filter element.

17. The brake dust collecting device according to claim 1, wherein said sealing element is connected fixedly to said wheel rim.

18. The brake dust collecting device according to claim 1, further comprising an electric pump for producing or enhancing said air flow.

* * * * *